US011671479B2

(12) United States Patent
Lu

(10) Patent No.: US 11,671,479 B2
(45) Date of Patent: *Jun. 6, 2023

(54) CONTEXTUAL REMOTE CONTROL USER INTERFACE

(71) Applicant: Google LLC, Mountain View, CA (US)

(72) Inventor: Jeff Ting Yann Lu, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/670,935

(22) Filed: Feb. 14, 2022

(65) Prior Publication Data

US 2022/0174109 A1 Jun. 2, 2022

Related U.S. Application Data

(63) Continuation of application No. 16/877,130, filed on May 18, 2020, now Pat. No. 11,252,218, which is a (Continued)

(51) Int. Cl.
G08C 17/02 (2006.01)
G08C 23/04 (2006.01)
(Continued)

(52) U.S. Cl.
CPC ............ H04L 67/025 (2013.01); G06F 3/00 (2013.01); G08C 17/02 (2013.01); G08C 23/04 (2013.01);
(Continued)

(58) Field of Classification Search
CPC ..... H04L 67/025; H04L 65/601; H04L 67/02; H04N 21/42204; H04N 21/4143;
(Continued)

(56) References Cited

U.S. PATENT DOCUMENTS 6,130,726 A 10/2000 Darbee et al.
6,133,847 A 10/2000 Yang
(Continued)

OTHER PUBLICATIONS

Notice of Allowance dated Jan. 24, 2020 in U.S. Appl. No. 16/279,872.
(Continued)

Primary Examiner — Adnan Aziz
(74) Attorney, Agent, or Firm — Byrne Poh LLP

(57) ABSTRACT

A mobile device is coupled to a computer system configured to access media content sources and play media content items provided thereby on a media device. The mobile device receives a first control specification that includes a plurality of first information items each associated with one of the media content sources and a first action definition. The first information items are concurrently displayed on a remote control user interface of the mobile device. In accordance with a selection of one of the first information items corresponding to a first content source, the mobile device transmits a command of a first action definition corresponding to the selected first information item to the computer system, and receives a second control specification that includes a plurality of second information items. Each second information item is associated with a respective content item provided by the first content source and a second action definition.

21 Claims, 10 Drawing Sheets

Related U.S. Application Data continuation of application No. 16/279,872, filed on Feb. 19, 2019, now Pat. No. 10,659,517, which is a continuation of application No. 15/928,933, filed on Mar. 22, 2018, now Pat. No. 10,212,212, which is a continuation of application No. 13/728,980, filed on Dec. 27, 2012, now Pat. No. 10,129,324.

(60) Provisional application No. 61/667,844, filed on Jul. 3, 2012.

(51) Int. Cl.

| | | |
|---|---|---|
| *H04N 21/422* | (2011.01) | |
| *H04N 21/4143* | (2011.01) | |
| *H04N 21/436* | (2011.01) | |
| *H04N 5/44* | (2011.01) | |
| *H04L 65/60* | (2022.01) | |
| *H04L 67/02* | (2022.01) | |
| *H04L 67/025* | (2022.01) | |
| *H04L 65/75* | (2022.01) | |
| *G06F 3/00* | (2006.01) | |

(52) U.S. Cl.
CPC ............ *H04L 65/75* (2022.05); *H04L 67/02* (2013.01); *H04N 5/44* (2013.01); *H04N 21/4143* (2013.01); *H04N 21/4222* (2013.01); *H04N 21/42204* (2013.01); *H04N 21/42224* (2013.01); *H04N 21/43615* (2013.01)

(58) Field of Classification Search
CPC ......... H04N 21/4222; H04N 21/43615; H04N 21/42224; H04N 5/44; G06F 3/00; G08C 23/04; G08C 17/02
See application file for complete search history.

(56) References Cited

U.S. PATENT DOCUMENTS

| | | | |
|---|---|---|---|
| 7,006,881 B1 | 2/2006 | Hoffberg et al. | |
| 7,039,858 B2 * | 5/2006 | Humpleman | H04L 67/02 |
| | | | 348/E5.006 |
| 7,155,305 B2 | 12/2006 | Hayes et al. | |
| 7,218,243 B2 | 5/2007 | Hayes et al. | |
| 7,259,710 B2 | 8/2007 | Kisliakov | |
| 7,774,811 B2 | 8/2010 | Polinski et al. | |
| 8,091,038 B1 | 1/2012 | Johnson et al. | |
| 8,473,865 B2 | 6/2013 | Huang et al. | |
| 8,660,402 B2 | 2/2014 | Newton et al. | |
| 2002/0002707 A1 | 1/2002 | Ekel et al. | |
| 2002/0087996 A1 | 7/2002 | Bi et al. | |
| 2002/0143805 A1 | 10/2002 | Hayes et al. | |
| 2003/0071792 A1 | 4/2003 | Safadi | |
| 2003/0095156 A1 | 5/2003 | Klein et al. | |
| 2003/0189509 A1 | 10/2003 | Hayes et al. | |
| 2003/0229900 A1 | 12/2003 | Reisman | |
| 2004/0148632 A1 | 7/2004 | Park et al. | |
| 2004/0183756 A1 | 9/2004 | Freitas et al. | |
| 2005/0004949 A1 | 1/2005 | Trepess et al. | |
| 2005/0097618 A1 | 5/2005 | Arling et al. | |
| 2006/0041926 A1 | 2/2006 | Istvan et al. | |
| 2006/0048184 A1 | 3/2006 | Poslinski et al. | |
| 2006/0053375 A1 | 3/2006 | Humpleman et al. | |
| 2006/0083375 A1 | 4/2006 | Kim et al. | |
| 2006/0224962 A1 | 10/2006 | Ostojic et al. | |
| 2006/0253874 A1 | 11/2006 | Stark et al. | |
| 2007/0088806 A1 | 4/2007 | Marriott et al. | |
| 2007/0136778 A1 | 6/2007 | Birger et al. | |
| 2007/0229465 A1 | 10/2007 | Sakai et al. | |
| 2007/0276925 A1 | 11/2007 | La Joie et al. | |
| 2008/0034081 A1 | 2/2008 | Marshall et al. | |
| 2008/0235620 A1 | 9/2008 | Musschebroeck et al. | |
| 2009/0061841 A1 | 3/2009 | Chaudhri et al. | |
| 2009/0164605 A1 | 6/2009 | Lusher et al. | |
| 2009/0172751 A1 | 7/2009 | Aldrey et al. | |
| 2009/0239587 A1 | 9/2009 | Negron et al. | |
| 2009/0284664 A1 | 11/2009 | Barry et al. | |
| 2010/0011299 A1 | 1/2010 | Brodersen et al. | |
| 2010/0066920 A1 | 3/2010 | Kwak | |
| 2010/0088630 A1 | 4/2010 | Morris | |
| 2010/0103125 A1 | 4/2010 | Kim et al. | |
| 2010/0138764 A1 | 6/2010 | Hatambeiki et al. | |
| 2010/0281066 A1 | 11/2010 | Haughawout et al. | |
| 2010/0321201 A1 | 12/2010 | Huang et al. | |
| 2011/0030013 A1 | 2/2011 | Diaz Perez | |
| 2011/0090402 A1 | 4/2011 | Huntington et al. | |
| 2011/0105186 A1 | 5/2011 | Griffin et al. | |
| 2011/0138327 A1 | 6/2011 | Scott et al. | |
| 2011/0181628 A1 | 7/2011 | You et al. | |
| 2011/0239142 A1 | 9/2011 | Steeves et al. | |
| 2011/0289113 A1 | 11/2011 | Arling et al. | |
| 2011/0317070 A1 | 12/2011 | Kimura et al. | |
| 2011/0321028 A1 | 12/2011 | Evans et al. | |
| 2012/0042246 A1 | 2/2012 | Schwesinger et al. | |
| 2012/0047119 A1 | 2/2012 | Kandekar et al. | |
| 2012/0054616 A1 | 3/2012 | Mittal | |
| 2012/0069131 A1 | 3/2012 | Abelow | |
| 2012/0112986 A1 | 5/2012 | McCoy et al. | |
| 2012/0144416 A1 | 6/2012 | Wetzer et al. | |
| 2012/0163770 A1 | 6/2012 | Kaiser et al. | |
| 2012/0173979 A1 | 7/2012 | Lee | |
| 2012/0192231 A1 | 7/2012 | Maa | |
| 2012/0200400 A1 | 8/2012 | Arling et al. | |
| 2012/0212680 A1 | 8/2012 | Kohanek | |
| 2012/0242526 A1 | 9/2012 | Perez et al. | |
| 2012/0271902 A1 | 10/2012 | Baliga et al. | |
| 2012/0272148 A1 | 10/2012 | Strober | |
| 2013/0069769 A1 | 3/2013 | Pennington et al. | |
| 2014/0029913 A1 | 1/2014 | Lopez et al. | |
| 2014/0068520 A1 | 3/2014 | Missig et al. | |
| 2014/0240104 A1 | 8/2014 | Arling et al. | |

OTHER PUBLICATIONS

Notice of Allowance dated Apr. 25, 2016 in U.S. Appl. No. 13/728,970.
Notice of Allowance dated May 28, 2020 in U.S. Appl. No. 16/357,059.
Notice of Allowance dated Jun. 15, 2018 in U.S. Appl. No. 15/249,264.
Notice of Allowance dated Jul. 25, 2018 in U.S. Appl. No. 13/728,980.
Notice of Allowance dated Oct. 5, 2018 in U.S. Appl. No. 15/928,933.
Notice of Allowance dated Oct. 5, 2021 in U.S. Appl. No. 16/887,130.
Notice of Allowance dated Nov. 28, 2018 in U.S. Appl. No. 15/927,594.
Office Action dated Jan. 9, 2017 in U.S. Appl. No. 13/728,980.
Office Action dated Jan. 28, 2015 in U.S. Appl. No. 13/728,980.
Office Action dated Feb. 19, 2019 in U.S. Appl. No. 16/279,872.
Office Action dated Mar. 8, 2017 in U.S. Appl. No. 15/249,264.
Office Action dated Mar. 8, 2018 in U.S. Appl. No. 13/728,980.
Office Action dated May 17, 2017 in U.S. Appl. No. 13/728,980.
Office Action dated May 21, 2018 in U.S. Appl. No. 15/928,933.
Office Action dated May 31, 2018 in U.S. Appl. No. 15/927,894.
Office Action dated Jun. 5, 2014 in U.S. Appl. No. 13/728,980.
Office Action dated Jun. 19, 2015 in U.S. Appl. No. 13/728,970.
Office Action dated Jun. 23, 2021 in U.S. Appl. No. 16/877,130.
Office Action dated Jun. 29, 2015 in U.S. Appl. No. 13/728,980.
Office Action dated Jul. 7, 2016 in U.S. Appl. No. 13/728,980.
Office Action dated Sep. 22, 2017 in U.S. Appl. No. 15/249,264.
Office Action dated Nov. 9, 2017 in U.S. Appl. No. 13/728,980.
Office Action dated Dec. 2, 2015 in U.S. Appl. No. 13/728,970.
Office Action dated Dec. 3, 2014 in U.S. Appl. No. 13/728,970.
Office Action dated Dec. 31, 2015 in U.S. Appl. No. 13/728,980.

* cited by examiner

Data Structure 200

| Information Item 112 | Display Instruction 115 | Action Definition 114 |
|---|---|---|
| "The Godfather" | Display in "List" Format | Send Command: Play "The Godfather" |
| "Citizen Kane" | Display in "List" Format | Send Command: Play "Citizen Kane" |
| "The Princess Bride" | Display in "List" Format | Send Command: Play "Citizen Kane" |

Figure 2A

Data Structure 210

| Information Item 112 | Display Instruction 115 | Action Definition 114 |
|---|---|---|
| ⦉⦉ | Display at {Position 1} | Send Command: {Rewind} |
| ▢ | Display at {Position 2} | Send Command: {Stop} |
| ▷ | Display at {Position 3} | Send Command: {Play} |
| ❙❙ | Display at {Position 4} | Send Command: {Pause} |
| ⦊⦊ | Display at {Position 5} | Send Command: {Fast-Forward} |

Commands 116

Figure 2B

CONTEXTUAL REMOTE CONTROL USER INTERFACE

CROSS-REFERENCE TO RELATED APPLICATIONS

This application is a continuation of U.S. patent application Ser. No. 16/877,130, filed May 18, 2020, which is a continuation of U.S. patent application Ser. No. 16/279,872, filed Feb. 19, 2019, which is a continuation of U.S. patent application Ser. No. 15/928,933, filed Mar. 22, 2018, which is a continuation of U.S. patent application Ser. No. 13/728,980, filed Dec. 27, 2012, which claims the benefit of U.S. Patent Application No. 61/667,844, filed Jul. 3, 2012, each of which is incorporated by reference herein in its entirety.

This application is related to U.S. patent application Ser. No. 15/249,264, filed Aug. 26, 2016, which is a continuation of U.S. patent application Ser. No. 13/728,970, filed Dec. 27, 2012, which claims the benefit of U.S. Patent Application No. 61/667,844, filed Jul. 3, 2012, each of which is incorporated by reference herein in its entirety.

This application is also related to U.S. patent application Ser. No. 16/357,059, filed Mar. 18, 2019, which is a continuation of U.S. patent application Ser. No. 15/927,894, filed Mar. 21, 2018, which is a continuation of U.S. patent application Ser. No. 13/728,980, filed Dec. 27, 2012, which claims the benefit of U.S. Patent Application No. 61/667,844, filed Jul. 3, 2012, each of which is incorporated by reference herein in its entirety.

TECHNICAL FIELD

The present invention relates generally to providing an adaptable remote control for use in media systems.

BACKGROUND

Modern media display systems often incorporate many different components for playing different types of media content. Moreover, users of media systems (such as multi-component home media systems) can now access media content from many different sources, such as broadcast, cable, or satellite television services, Internet based movie services, Internet based music services, local media storage, shared media storage, and the like. Media from multiple different sources is increasingly accessible through individual devices, such as a DVD or BLU-RAY® player that also provides access to Internet based video services. Different display components and content sources, however, require unique remote control environments and interfaces to enable a user to effectively manipulate the device or media source. For example, the ideal remote control interface for browsing and selecting locally stored photographs to be viewed on a display device is different than the ideal remote control interface for browsing and selecting movies from an Internet based movie service. Traditional remote controls are unable to dynamically adapt to the particular media source or device that a user wishes to access. Accordingly, it is highly desirable to provide systems and methods for presenting various remote control interfaces to a user in a system that provides access to multiple media devices and sources.

SUMMARY

The above deficiencies and other problems associated with traditional remote controls are reduced or eliminated by the disclosed methods and devices.

A computer-implemented method for allowing interaction between devices is performed at a first device including a processor and memory. The method includes transmitting, to a second device, an information item for display on the second device and an action definition associated with the information item. The action definition includes a command to be sent by the second device to the first device in response to a user selection of the information item at the second device.

A computer-implemented method for allowing interaction between devices is performed at a first device including a processor and memory. The method includes executing an application that operates interactively with a remote control application executing on a second device. The second device includes a touch-screen display. The method includes transmitting, to a second device, an information item for display on the second device and an action definition associated with the information item. The action definition includes a command to be sent by the second device to the first device in response to a user selection of the information item at the second device.

In some implementations, the method further comprises receiving a command from the second device in response to a selection of the information item by the user; and performing a predefined action in response to receiving the command.

In some implementations, the predefined action is causing display of media content associated with the information item on a display device associated with the first device.

In some implementations, the media content is one or more of: a video, a television station, an audio track, an audio station, and a picture.

In some implementations, the predefined action is a media-device control action.

In some implementations, the media-device control action is one or more of: changing a channel, changing volume level, changing a device setting, initiating a record function, adjusting a playback speed, and changing an operating state of a device.

In some implementations, the information item is a label.

In some implementations, the label includes a graphic.

In some implementations, the label includes text.

In some implementations, the method further comprises transmitting, to the second device, a collection of information items, and transmitting, to the second device, a display instruction associated with the collection of information items.

In some implementations, the display instruction indicates that the collection of information items is to be displayed in list format, a tree format, a gallery format, or a hierarchical folder format.

In some implementations, the method further comprises transmitting, to the second device, a group of collections; and transmitting, to the second device, a display instruction associated with the group of collections.

In some implementations, the display instruction indicates that a respective collection of the group of collections is to be displayed in a separate tab of a user interface on the second device.

In some implementations, the display instruction indicates that a respective collection of the group of collections is to be displayed in a separate folder of a user interface of the second device.

In some implementations, the information item and the action definition are incorporated in an HTML file.

In some implementations, the information item is one of a plurality of information items, the action definition is one of a plurality of action definitions, and the plurality of information items and the plurality of action definitions are incorporated in the HTML file.

In some implementations, the HTML file specifies a graphical layout for the plurality of information items and the plurality of action definitions.

In some implementations, the first device is configured to execute one or more applications.

In some implementations, the one or more applications are one or more of a web browser, a media browser, and a media player.

In another aspect, the method includes receiving a command from the second device in response to a selection of the information item by the user, and performing a predefined action in response to receiving the command. The predefined action is causing display of media content associated with the information item on a display device associated with the first device. The method further includes transmitting, to the second device, a collection of information items, and transmitting, to the second device, a display instruction associated with the collection of information items. The method further includes transmitting, to the second device, a group of collections, and transmitting, to the second device, a display instruction associated with the group of collections.

A method is performed at a mobile device including a processor, memory, a display, and an input device. The method includes receiving, from a TV processor, an information item and an action definition associated with the information item. The action definition includes a command to be sent by the mobile device to the TV processor in response to a user selection of the information item. The method further includes displaying the information item on the display. The method further includes receiving a selection of the information item from a user via the input device. The method further includes transmitting the command from the mobile device to the TV processor.

In some implementations, the method further includes receiving, from the TV processor, a display instruction to display media content associated with the information item.

In some implementations, the media content is one or more of: a video, a television station, an audio track, an audio station, and a picture.

In some implementations, the action definition is one or more of changing a channel, changing volume level, changing a device setting, initiating a record function, adjusting a playback speed, and changing an operating state of a device.

In some implementations, information item is a label.

In some implementations, the label includes a graphic.

In some implementations, the label includes text.

In some implementations, the information item is displayed in a predefined format based at least in part on a property of the information item.

In some implementations, the information item is one of a collection of information items, and the collection of information items is displayed in a predefined format based at least in part on a property of the information items in the collection.

In some implementations, the predefined format is a list format, a tree format, a gallery format, or a hierarchical folder format.

In some implementations, the method further includes: receiving, from the TV processor, a collection of information items; and receiving, from the TV processor, a display instruction associated with the collection of information items.

In some implementations, the method further includes: receiving, from the TV processor, a group of collections; and receiving, from the TV processor, a display instruction associated with the group of collections.

In some implementations, the display instruction indicates that a respective collection of the group of collections is to be displayed in a separate tab of a user interface on the mobile device.

In some implementations, the display instruction indicates that a respective collection of the group of collections is to be displayed in a separate folder of a user interface of the mobile device.

In some implementations, the TV processor is configured to execute one or more applications.

In some implementations, the one or more applications are one or more of a web browser, a media browser, and a media player.

In some implementations, the mobile device is a mobile telephone.

In another aspect, the method includes receiving, from the TV processor, a display instruction associated with the information item. The method further includes receiving, from the TV processor, a collection of information items, and receiving, from the TV processor, a display instruction associated with the collection of information items. The method further includes receiving, from the TV processor, a group of collections, and receiving, from the TV processor, a display instruction associated with the group of collections.

A device includes one or more processors, memory, and one or more programs, wherein the one or more programs are stored in the memory and configured to be executed by the one or more processors. The programs include instructions for: at a first device, transmitting, to a second device, an information item for display on the second device and an action definition associated with the information item. The action definition includes a command to be sent by the second device to the first device in response to a user selection of the information item at the second device.

In some implementations, the device further includes instructions for performing any of the above described methods.

A device includes one or more processors, memory, and one or more programs, wherein the one or more programs are stored in the memory and configured to be executed by the one or more processors. The programs include instructions for: at a first device executing an application that operates interactively with a remote control application executing on a second device. The second device includes a touch-screen display. The programs include instructions for: at a first device transmitting, to a second device, an information item for display on the second device and an action definition associated with the information item. The action definition includes a command to be sent by the second device to the first device in response to a user selection of the information item at the second device.

In some implementations, the device further includes instructions for performing any of the above described methods.

In another aspect, a device includes one or more processors, memory, and one or more programs, wherein the one or more programs are stored in the memory and configured to be executed by the one or more processors. The programs include instructions for: receiving, from a TV processor, an information item and an action definition associated with the information item. The action definition includes a command to be sent by the mobile device to the TV processor in response to a user selection of the information item. The programs also include instructions for displaying the information item on the display, receiving a selection of the information item from a user via the input device, and transmitting the command from the mobile device to the TV processor.

A non-transitory computer-readable storage medium stores one or more programs comprising instructions that, when executed by a first device, cause the first device to transmit, to a second device, an information item for display on the second device and an action definition associated with the information item. The action definition includes a command to be sent by the second device to the first device in response to a user selection of the information item at the second device.

In some implementations, the non-transitory computer-readable storage medium stores one or more programs comprising instructions for performing any of the above described methods.

A non-transitory computer-readable storage medium stores one or more programs comprising instructions that, when executed by a first device, cause the first device to transmit, to execute an application that operates interactively with a remote control application executing on a second device. The second device includes a touch-screen display. The instructions also cause the first device to transmit, to a second device, an information item for display on the second device and an action definition associated with the information item. The action definition includes a command to be sent by the second device to the first device in response to a user selection of the information item at the second device.

In some implementations, the non-transitory computer-readable storage medium stores one or more programs comprising instructions for performing any of the above described methods.

In another aspect, a non-transitory computer-readable storage medium stores one or more programs comprising instructions that, when executed by a mobile device, cause the mobile device to receive, from a TV processor, an information item and an action definition associated with the information item. The action definition includes a command to be sent by the mobile device to the TV processor in response to a user selection of the information item. The instructions also cause the mobile device to: display the information item on the display, receive a selection of the information item from a user via the input device, and transmit the command from the mobile device to the TV processor.

In some implementations, the non-transitory computer-readable storage medium stores one or more programs comprising instructions for performing any of the above described methods.

A method for allowing interaction between devices is performed at a first device including a processor and memory. The method includes executing an application that operates interactively with a remote control application executing on a second device. The second device includes a touch-screen display. The method further includes transmitting, to the second device, one or more information items for display by the second device as one or more selectable display items. Each respective information item is associated with an action definition, the action definition including a command to be sent by the second device to the first device in response to a user selection of the respective information item. The method further includes receiving a command from the second device in response to a selection of a first one of the selectable display items by the user. The method further includes performing a predefined action in response to receiving the command.

A device includes one or more processors, memory, and one or more programs, wherein the one or more programs are stored in the memory and configured to be executed by the one or more processors. The programs include instructions for: executing an application that operates interactively with a remote control application executing on a second device, the second device including a touch-screen display; transmitting, to the second device, one or more information items for display by the second device as one or more selectable display items, wherein each respective information item is associated with an action definition, the action definition including a command to be sent by the second device to the first device in response to a user selection of the respective information item; receiving a command from the second device in response to a selection of a first one of the selectable display items by the user; and performing a predefined action in response to receiving the command.

A non-transitory computer-readable storage medium stores one or more programs comprising instructions that, when executed by a first device, cause the first device to: execute an application that operates interactively with a remote control application executing on a second device, the second device including a touch-screen display; transmit, to the second device, one or more information items for display by the second device as one or more selectable display items, wherein each respective information item is associated with an action definition, the action definition including a command to be sent by the second device to the first device in response to a user selection of the respective information item; receive a command from the second device in response to a selection of a first one of the selectable display items by the user; and perform a predefined action in response to receiving the command.

BRIEF DESCRIPTION OF THE DRAWINGS

FIGS. 2A-B are block diagrams illustrating data structures for use in a media system with a contextual remote control, in accordance with some implementations.

DETAILED DESCRIPTION

Figure 1:
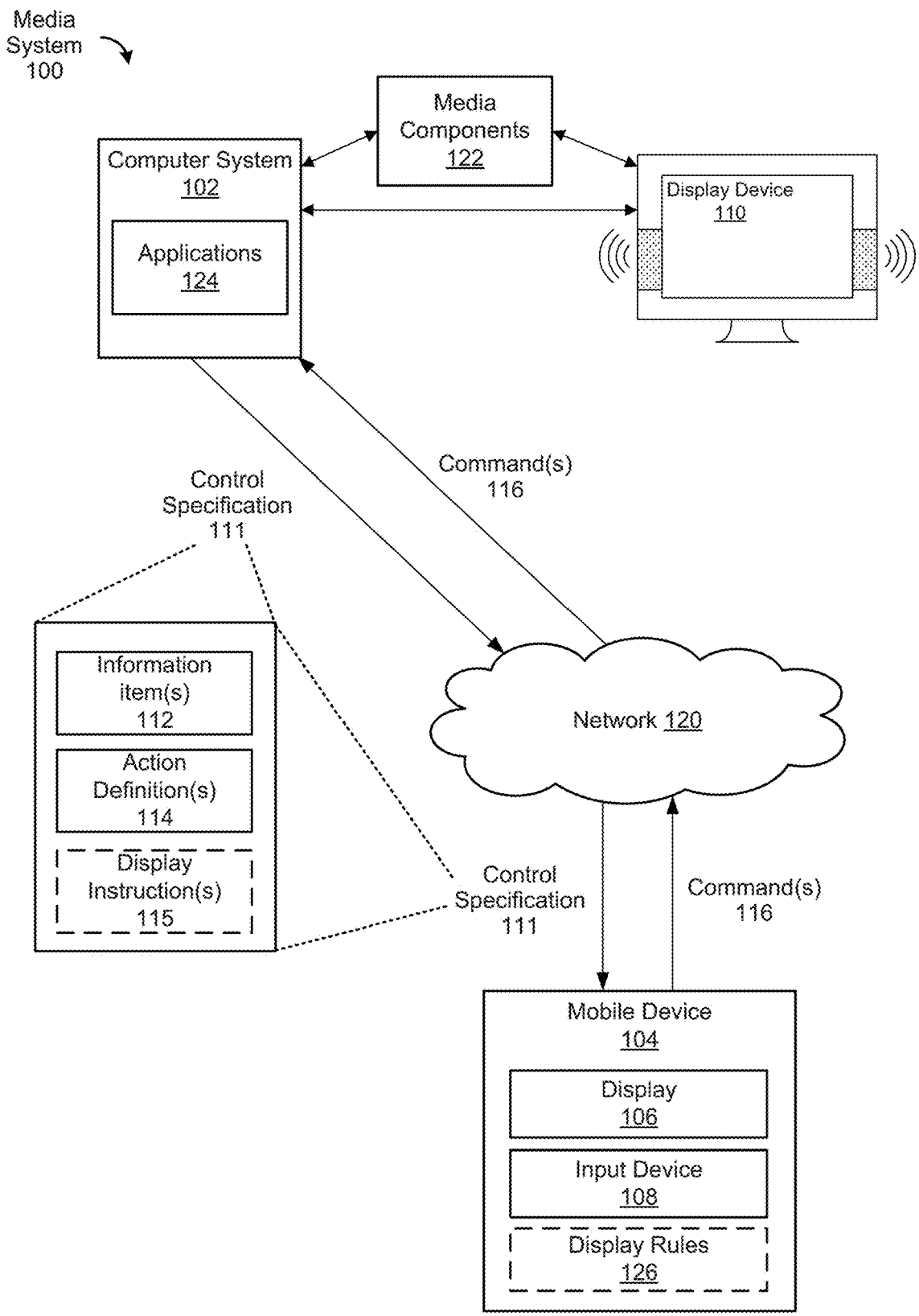
FIG. 1 is a block diagram illustrating the infrastructure of a media system, in accordance with some implementations.

In light of the increasing complexity and diversity of media sources that are accessible through modern media systems, it is highly desirable to provide a remote control system that adapts to the particular media content source a user has selected. As noted above, media devices (including computers) are increasingly able to access many different types of media content, including but not limited to, videos (e.g., movies, home videos, short-form videos, television shows, etc.), audio tracks (e.g., music, podcasts, etc.), television stations (e.g., satellite, broadcast, and cable television channels), audio/radio stations, and pictures. Moreover, media devices are increasingly able to access these types of media content from multiple different sources, such as broadcast, cable, or satellite television sources, Internet-based streaming movie services, Internet-based music services, and the like.

Media devices are increasingly able to provide multiple functions in a single device. In some cases, media devices are essentially computer systems with operating systems that host and execute multiple individual applications. These applications may be configured to access distinct media sources, or to display media items of specific types. But different media sources and media types often require unique user-interfaces so that users can browse media content and control the system with ease. When remote control devices are provided for use with such multi-function computer systems, it is advantageous that they can adapt to a user-interface that is most convenient for that media source or type. For example, it may be more convenient for a user to browse photos on a remote control when they are categorized by date and shown as thumbnails in a "gallery" type view. On the other hand, when browsing a list of movies, it may be more convenient when the movies are listed in alphabetical order by title, and displayed in a list format. Moreover, different media sources or types often require different control functions to be available to a user. That is, a video viewing application will likely require play and pause functions, but will not require channel change functions. Similarly, a photo slideshow viewing application may require a "photo transition type" selector, whereas a streaming music application will have no use for such a function. Accordingly, a remote control for use with a system that accesses multiple media sources and types should adapt so that the most advantageous user interface is provided to a user. In some of the disclosed implementations, remote controls have buttons and/or displays that are dynamically reconfigurable, as on a mobile phone or a remote with programmable display or screen. As described below, in some implementations, the user-interface is based on the application, the type of media, or the media source that a user is accessing on a computer system.

Moreover, media devices that can host multiple applications are often designed so that new and different applications can be installed and executed by the media device. As new applications are added to the combination media device, a remote control for use with these types of media devices should also be able to seamlessly adapt to new applications without a user needing to re-program the remote control. Implementations described herein provide a remote control system that is adaptable to the different applications that may be executed within a media system.

Attention is directed to FIG. 1, which is a block diagram illustrating the functional components of a media system 100 in accordance with some implementations. The media system 100 includes a display device 110, a computer system 102, and a mobile device 104. As described in detail herein, the computer system 102 stores and executes a variety of applications 124 for accessing a variety of media content items. The mobile device 104 communicates with the computer system 102 to generate and display user interfaces (e.g., remote control interfaces) that are tailored to the particular application that is being executed on the computer system 102.

In some implementations, the media system 100 includes additional media components 122, such as TV tuners (e.g., cable or satellite receivers), DVR/VCR/DVD players, local media storage (e.g., hard drives or other non-volatile storage devices), audio receivers or amplifiers, and the like. The display device 110 is any device, component, or combination of components for displaying media content (including audio-visual content) to a viewer, and includes LCD displays, plasma displays, projectors, televisions, speakers, etc. It should be appreciated that the various components of the media system 100 can be implemented as separate components or as parts of a single component. For example, the computer system 102 and the display device 110 could be implemented as one combined component that includes the functions of both the computer system 102 and the display device 110. For convenience of illustration and explanation, the media system 100 is described below as being implemented as separate components.

The computer system 102 facilitates the presentation of media on the display device 110. For example, in some implementations, the computer system 102 is a media device that provides access to various media sources, such as Internet based media sources, locally stored media, etc. The computer system 102 also supports multiple user interfaces and display functions for various types of media content, such as television stations/channels, audio tracks (e.g., music, audio books, spoken word, podcasts, etc.), photos/pictures, videos (e.g., movies, home videos, etc.), and textual media. In some implementations, the computer system 102 includes applications 124. The applications 124 allow a user to access and display these media content items on the display device 110. The applications 124 may include applications that access remotely stored content as well as locally stored content. For example, a photo viewing application may allow a user to view remotely and/or locally stored photos. In some implementations, the computer system 102 includes an operating system that supports the execution of the applications 124, as described below.

The media system 100 also includes a mobile device 104. The mobile device 104 includes a display 106, such as an LCD display, and an input device 108, such as physical buttons or a touch-screen interface. In some implementations, the mobile device 104 is a multi-function device that can act as a remote control for the media system 100. In some implementations, the mobile device 104 executes one or more applications that enable remote control functionality. In some implementations, the mobile device 104 is an electronic device, such as a smartphone, a computer (including tablet computers, laptop computers, desktop computers, handheld computers, etc.), digital audio player, gaming controller, watch, programmable remote control, and the like. In some implementations, the mobile device 104 communicates with the computer system 102 via a network 120. The mobile device 104 is described in greater detail herein.

The computer system 102 and the mobile device 104 work in conjunction to generate and present to a user various user interfaces and control schemes that are tailored to particular applications 124. In some implementations, as described below, the computer system 102 sends a control specification 111 to the mobile device 104. The control specification 111 provides the information necessary for the mobile device 104 to act as a remote control for a particular media application. In some implementations, the control specification 111 includes information items 112 (e.g., representing media content items and/or control functions), action definitions 114 (e.g., commands to be executed upon user selection of an information item), and display instructions 115 (e.g., where and how to display the information items 112). These components of the control specification 111 are described in detail herein. Exemplary data structures of control specifications 111 are discussed below in reference to FIGS. 2A-B.

In some implementations, the mobile device 104 is adapted to present information items 112 to a user in a particular format or scheme depending on the type of media content that the information items 112 represent. For example, when a user is browsing photographs, the mobile device 104 may be adapted to recognize that the browsed items are photographs, and display the photographs (i.e., information items) on the mobile device 104 as a gallery of tiled thumbnails. In another example, the mobile device 104 may be adapted to recognize that the browsed items are movies, and display the movie titles in an alphabetical list. In some implementations, these display schemes are selected when the mobile device 104 recognizes that the user is browsing media content of the type "photographs" or "movies." In these examples, the display scheme is selected based only on the type of content being browsed, without regard to the application 124 that is being executed.

In some implementations, however, the particular display format or scheme that the mobile device 104 implements depends on the type of application 124 that is running on the computer system 102. For example, the computer system 102 may identify that a photo viewing application is currently being executed, and instruct the mobile device 104 to implement display rules (e.g., display rules 126, discussed below) that are known to be associated with photo viewing applications. In some implementations, the applications 124 actively specify the particular display format or scheme that should be implemented on the mobile device 104. For example, a photo viewing application being executed by the computer system 102 may specify that photographs are to be displayed on the mobile device 104 as thumbnails (e.g., using display instructions 115). Various ways of determining and specifying how information items 112 are displayed on the mobile device 104 are discussed in detail below.

In some implementations, the mobile device 104 provides media-display controls to a user. Media-display controls allow a user to manipulate the display of and/or interact with applications 124, or with the media content items accessible through the applications 124. Media-display controls include, for example, playback controls, volume controls, channel controls, media content browsing/selection controls, video-game controls, mode controls, device controls, etc. For example, when the computer system 102 is executing an application associated with a streaming movie service, the mobile device 104 may display video playback controls. When the computer system 102 is executing a photo viewing application, on the other hand, the mobile device 104 may display "slideshow" controls (e.g., play, pause, photo display duration, photo transition type, etc.). Further, when the computer system 102 is executing a game application, the mobile device 104 may display a game controller, so that the user can manipulate the game through the mobile device 104. In some implementations, the media display controls are specified by the computer system 102 and/or the applications 124 that are active on the computer system 102. Any type of control that is available on traditional remote controls may be implemented as a media-display control on the mobile device 104.

Returning to FIG. 1, in some implementations, the computer system 102 sends a control specification 111 to the mobile device 104. As described above, the control specification 111 provides the information necessary for the mobile device 104 to act as a remote control for a particular media application. In some implementations, the control specification 111 includes information items 112 and action definitions 114.

An information item 112 is information that describes, indicates, or represents a media content item, feature, and/or control (such as a media-display control) associated with an application 124. Information items 112 include, but are not limited to, text, graphics (including icons, pictures, images, photographs, etc.), sounds, lights, and the like. In some implementations, information items 112 are titles, file names, thumbnails, and/or descriptions of media content items. (As noted above, media content items may include videos, television stations, audio tracks, audio/radio stations, pictures, etc.) Information items 112 that represent media-display controls may include, for example, text, icons, images, etc., that indicate functions such as "channel up," "volume up," "pause video," etc. In some implementations, as described below, information items 112 are selectable via an input device 108 on the mobile device 104. For example, an information item 112 may be a button, hyperlink, actionable text, or some other component that a user may click, press, or otherwise select (e.g., by clicking or pressing) on the mobile device 104. As described below, the mobile device 104 can be adapted to send a particular command 116 to the computer system 102 when an information item 112 is selected by a user.

Information items 112 are sometimes not selectable, but rather provide information to a user. For example, an information item 112 may be an icon of a speaker for display near selectable "arrow buttons" for volume control. The speaker icon in this example is not itself selectable, but rather indicates that nearby "arrow buttons" control the volume of a device, such as the display device 110.

In order to provide a convenient and efficient user experience, an adaptable remote control according to the present implementations should be able to display information items 112 in a format that is clear, and that is easy to understand, navigate, and control. As noted above, some display formats are better suited to particular types of media content items or information items 112. Accordingly, there are several ways for the media system 100 to determine the appropriate display scheme for given information items 112.

In some implementations, the type of media content item that an information item 112 represents defines how the information item 112 is to be displayed. Accordingly, in some implementations, display rules 126 associate different types of media content items with different display instructions. In some implementations, display rules 126 are stored on the mobile device 104 such that the applications 124 need not send display instructions to the mobile device 104. Rather, the mobile device 104 performs a look-up of the display rules 126 to determine where and how to display the information items 112. In some implementations, the display rules 126 include specifications for any display attribute of the information items 112, including type, size, format, color, font, shape, location, etc. For example, display rules 126 may specify that information items 112 representing photographs are to be displayed in a thumbnail gallery format, and that information items 112 representing television channels or movie titles are to be displayed in a list format.

In some implementations, the applications 124 include display instructions 115 in the control specification 111. In some implementations, display instructions 115 indicate where or how, on the display 106 of the mobile device 104, the information items 112 should be displayed (e.g., where on the display 106 a movie title or a control "button" should appear). In some implementations, the display instructions 115 include information about the format in which information items 112 should be presented, as discussed above. In some implementations, the display instructions include specifications for any display attribute of the information items 112, including type, size, format, color, font, shape, location, etc.

In some implementations, both display rules 126 and display instructions 115 are used to generate the display scheme or overall layout of the mobile device 104 when it is being used as a remote control device for the computer system 102. In some implementations, the display rules 126 are used as default display rules. In some implementations, the default display rules are overridden when the control specification 111 includes display instructions 115.

In some implementations, the display scheme or overall layout of a remote control interface is affected by properties of the particular mobile device 104 on which they are to be displayed. For example, the computer system 102 may transmit to a mobile device 104 information items 112 corresponding to a list of television channels. If the mobile device 104 is a smaller device (e.g., a mobile telephone), the information items may be displayed in a textual list. If the mobile device 104 is a larger device (e.g., a tablet, desktop, or laptop computer), the information items 112 may be displayed as thumbnails in a tiled arrangement. In some implementations, display instructions 115 are tailored to specific form factors of mobile device 104, such that the display instructions 115 are specific to the size and functionality of the mobile device 104. In some implementations, however, display instructions 115 are agnostic to the type, size, or functionality of the mobile device 104, and the same display instruction 115 is used regardless of the properties of the particular mobile device 104.

In some implementations, multiple display instructions 115 are included in the control specification 111 so that different display schemes can be specified for devices of different size and functionality. Where multiple display instructions 115 are provided, either the computer system 102 (or the applications 124 executed on the computer system 102) or the mobile device 104 may select which display instruction 115 to implement.

Returning to FIG. 1, the control specification 111 also includes action definitions 114. Action definitions 114 specify a particular action that should be performed by the computer system 102 (or an application 124) in response to a user input at the mobile device 104. In some implementations, an action definition 114 includes or specifies a command 116 that is to be sent by the mobile device 104 to the computer system 102 in response to a user selection of an information item 112. Commands 116, discussed in greater detail below, are any information, data, or signal that specifies an action that the computer system 102, or an application 124 executing on the computer system 102, should perform. In some implementations, action definitions 114 are associated with information items 112 so that a particular action is performed in response to a user selection of an information item 112. For example, where an information item 112 is a title of a movie, an associated action definition 114 may indicate that selection of that movie title will cause that movie to be played. Further, when an information item 112 is an icon representing a media-display control (e.g., a "pause" button), an associated action definition 114 may indicate that selection of the button will cause a video to be paused.

In some implementations, the information items 112, action definitions 114, and display instructions 115 are sent to the mobile device 104 as discrete data structures and/or specifications. In some implementations, the information items 112, action definitions 114, and display instructions 115 are sent to the mobile device 104 as a single, combined data structure. In some implementations, the control specification 111 is incorporated into an HTML document. In some implementations, the HTML document contains information items 112 in the form of textual hyperlinks or selectable graphics, and action definitions 114 in the form of executable functions to be performed in response to a user selection of the textual hyperlinks or selectable graphics in the HTML document. In some implementations, display instructions 115 are incorporated into the HTML document itself in accordance with HTML standards.

As described above, each application 124 may provide a complete specification (e.g., using the control specification 111) for the appearance and functionality of the mobile device 104. However, in some implementations, the mobile device 104 and/or the computer system 102 include graphical and/or functional templates for use by the applications 124. In some implementations, templates are provided where a portion of the display 106 of the mobile device 104 is configured to display predefined playback controls, and another portion of the display 106 is freely customizable by the particular application 124.

In some implementations, templates are fully defined user interfaces, including predefined graphical elements, controls, displays, information items 112, action items 114, etc. In some implementations, these templates are stored on the mobile device 104, and are activated or displayed on the mobile device 104 in response to a command from the computer system 102. In some implementations, the computer system 102 can request a particular template to be displayed on the mobile device 104 based on the application that is being executed on the computer system 102. For example, if the computer system 102 is executing a video game, it will send a command to the mobile device 104 requesting display of a predefined game controller. In other example, if the computer system 102 is displaying audio/visual media content, it will send a command to the mobile device 104 requesting display of a predefined media remote control. In some implementations, the commands sent from the computer system 102 simply identify a mode of the computer system 102, and the mobile device 104 is configured to recognize a particular template for use with that mode. The mode of the computer system 102 may correspond to any state or status of the computer system 102, such as a type of application that is being executed (e.g., a video game application, a media player application), or an operating state (e.g., media playback state, idle state, etc.). In some implementations, information specifying the mode of the computer system 102 is sent to the mobile device 104 in addition to, instead of, or as part of the control specification 111. Other template configurations, and other modes and application types, are also contemplated by the present disclosure.

FIG. 2A illustrates a data structure 200 of a control specification 111 showing the relation of information items 112, action items 114, and display instructions 115 according to some implementations. In this example, the data structure 200 is sent to the mobile device 104 to specify how movie titles are to be displayed, and what actions should be taken in response to a selection of those movie titles. In this example, the movie titles "The Godfather," "Citizen Kane," and "The Princess Bride" are textual information items 112 that are to be displayed on the mobile device 104. (While the information items 112 are shown as actual text in FIG. 2A, the information items 112 may be in other formats as well, including addresses to remotely stored text, graphics, etc.) The display instructions 115 identify how the information items 112 are to be displayed on the mobile device 104. In this example, the information items 112 are to be displayed in a "list" format. The data structure 200 also includes action definitions 114 associated with the movie titles: in response to a selection of "The Godfather," the command (e.g., command 116) "Play 'The Godfather'" is to be sent to the computer system 102.

FIG. 2B illustrates another exemplary data structure 210 of a control specification 111, where information items 112 correspond to media-display controls. In this example, the information items 112 are icons that represent typical playback control buttons (e.g., rewind, stop, play, pause, and fast-forward). Of course, information items 112 are not limited to playback controls, and any type of control may be implemented in similar fashion. The display instructions 115 indicate where, on a display 106 of a mobile device 104, the information items 112 are to be displayed. While display instructions 115 are represented as {Position "n"}, it is understood that the display instructions 115 may include any instructions that define how or where to display the information items 112, including coordinate pairs. Reference to predetermined positions (e.g., predetermined positions 306, shown in FIG. 3) in this example illustrate one possible implementation. Returning to data structure 210, action definitions 114 specify the commands 116 that are to be sent to the computer system 102 in response to a user selection of one of the playback controls. Commands 116 are any information, data, or signals that specify an action that the computer system 102, or an application 124 executing on the computer system 102, should perform. In data structure 210, the commands 116 include {Rewind}, {Stop}, {Play}, {Pause}, and {Fast-Forward}. Thus, when a user selects the information item 112 corresponding to the right-facing single triangle (a typical "play" icon), a command 116 {Play} is sent to the computer system 102.

Figure 3:
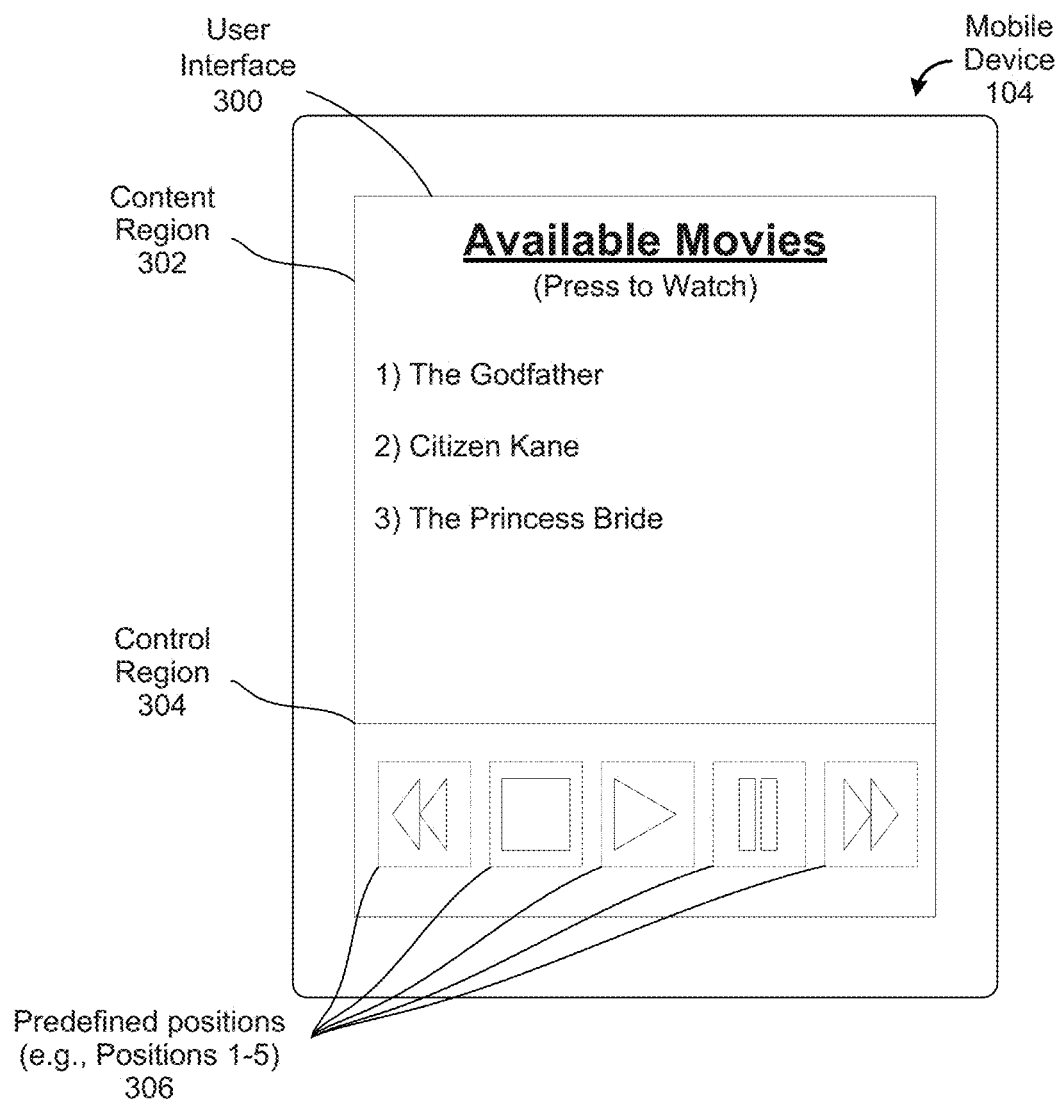
FIG. 3 illustrates an exemplary user interface for use in a media system with a contextual remote control, in accordance with some implementations.

In some implementations, a control specification 111 includes various data structures, each defining a different portion or aspect of a remote control user interface. For example, FIG. 3 illustrates an exemplary user interface 300 in accordance with some implementations. The user interface 300 incorporates information from data structures 200 and 210. In a content region 302, the information items 112 from data structure 200 are displayed in accordance with the display instructions 115 associated therewith. In a control region 304, the information items 112 from the data structure 210 are displayed in accordance with the display instructions 115 associated therewith. The layout shown in FIG. 3 is provided as an example layout, and other layouts are also contemplated by the present disclosure. For example, a user interface 300 need not be divided into a content region 302 and a control region 304. User interfaces 300 may include any number of different regions, or no delimited regions at all. Moreover, screen positions of information items 112 need not correspond to predefined positions (e.g., predefined positions 306) on the display 106 of the mobile device 104. Rather, display instructions 115 can specify display locations or other display properties by any appropriate means. Accordingly, developers are given the flexibility to define an interface that is specifically adapted for use with their own application 124.

As described above, in some implementations, the computer system 102 (or an application 124 being executed on the computer system 102) sends multiple information items 112 to the mobile device 104. In some implementations, the multiple information items 112 are sent as a group of multiple information items 112, which may be described as a collection of information items 112. In some implementations, information items 112 each represent a media content item. For example, a collection of information items 112 may correspond to a folder of digital photographs, where each information item 112 represents a single photograph within that folder. In some implementations, collections of information items 112 are themselves represented by information items 112. That is, an information item 112 may refer to an individual media content item (such as a digital photograph), or may represent the folder containing multiple media content items (such as a folder containing digital photographs).

Figure 4:
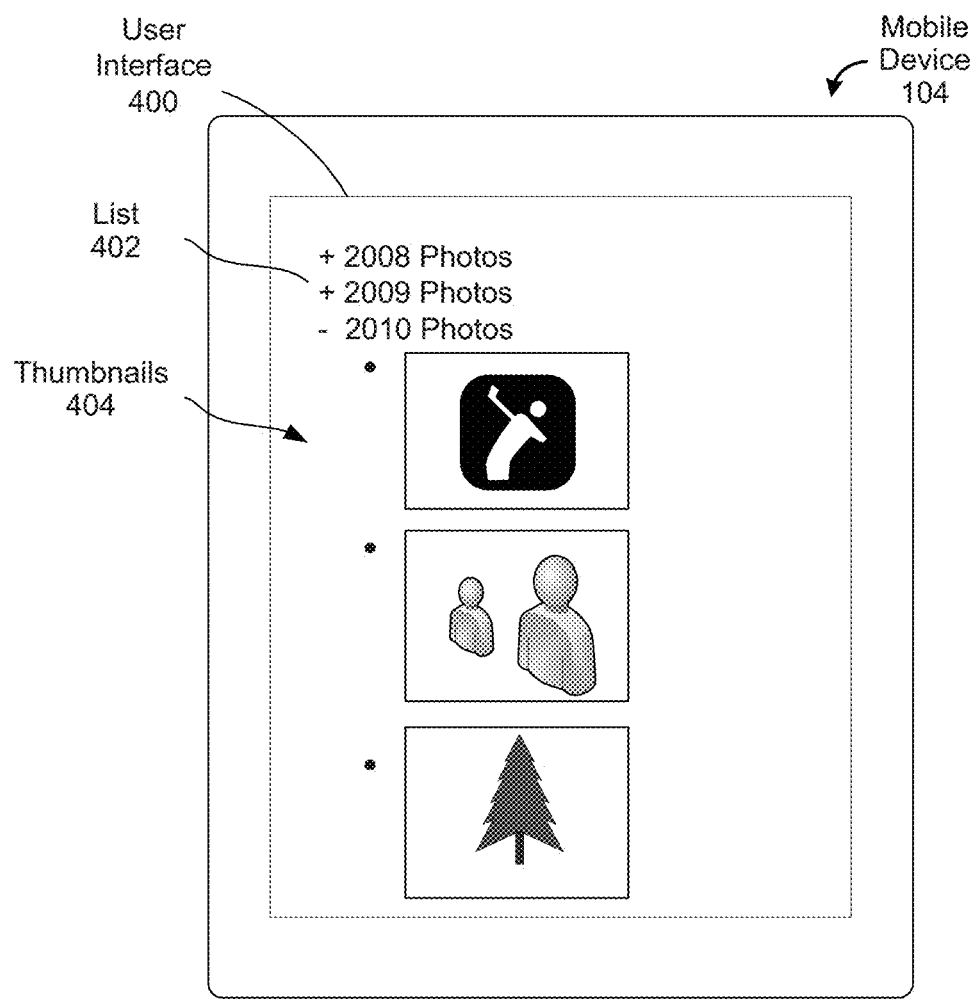
FIG. 4 illustrates an exemplary user interface for use in a media system with a contextual remote control, in accordance with some implementations.
Figure 5:
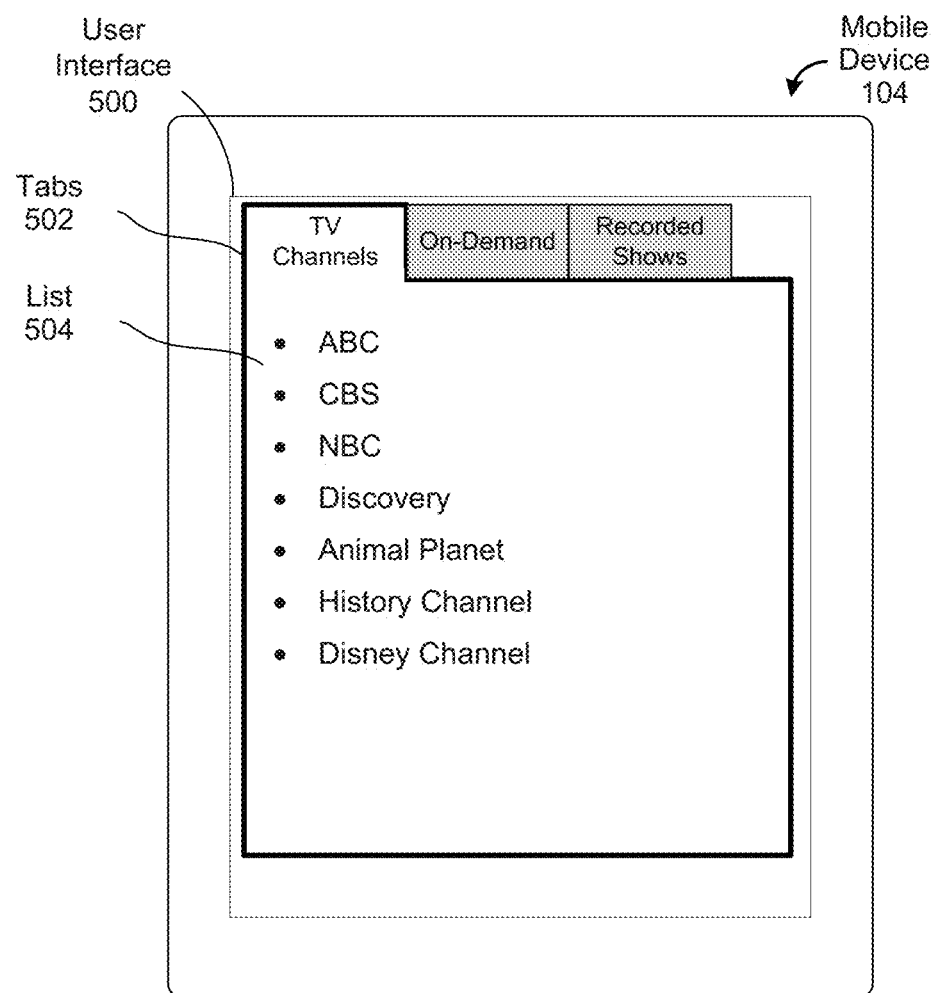
FIG. 5 illustrates an exemplary user interface for use in a media system with a contextual remote control, in accordance with some implementations.

In some implementations, the computer system 102 (or an application 124 being executed on the computer system 102) sends multiple collections of information items 112 (or a "collection of collections") to the mobile device 104. In some implementations, the collections are related to one another through hierarchical or categorical organization. The mobile device 104, in turn, may display the information items 112 representing the collections (and those representing individual media content items) according to those hierarchical or categorical organizations. For example, the computer system 102 may send to the mobile device multiple folders (e.g., collections), each containing multiple information items 112 (e.g., representing individual media content items.) The folders may then be displayed according to their hierarchical or categorical organization. FIGS. 4 and 5, discussed below, illustrate exemplary user interfaces where collections of information items 112 and collections of collections are displayed in accordance with these ideas.

FIG. 4 illustrates an exemplary user interface where collections of information items are displayed on the mobile device 104. In this example, the computer system 102 sends information items representing multiple photo albums (e.g., "2008 Photos," "2009 Photos," etc.), where the photo albums are organized in a date and/or subject matter hierarchy (e.g., a parent folder "2010 Photos" may contain several sub folders representing photo albums, such as "vacation," "kids," "holidays," etc.). In some implementations, the display rules 126 or the display instructions 115 indicate that parent folders are to be displayed as a list and the sub-folders (corresponding to individual albums) are to be displayed as thumbnails. As shown in FIG. 4, parent folders are displayed as list 402, and sub-folders are displayed as thumbnails 404. Further, in FIG. 4, the thumbnail 404 that is selected for each sub-folder may be an image from within the sub-folder. In some implementations, the selected thumbnail image is the first image within the sub-folder according to some ranked order, including alphabetical order, chronological order, and the like.

FIG. 5 illustrates an exemplary user interface 500 where a collection of collections is displayed on the mobile device 104. In some implementations, the computer system 102 sends multiple collections of information items 112 (e.g., a collection of collections), where each collection includes a different type of information item 112. For example, the computer system 102 may send information items 112 grouped into three collections: one representing TV channels, another representing available "on-demand" movies, and another representing previously recorded shows. As shown in FIG. 5, the collections are each displayed in a separate tab 502 of the user interface 500, and the individual information items 112 are displayed in a list 504.

The user interfaces 400 and 500 described with reference to FIGS. 4 and 5 are merely exemplary. Other user interfaces are also contemplated by and are consistent with the present disclosure. Indeed, the display instructions 115 and display rules 126 disclosed herein are flexible enough to allow many different user interfaces to be generated by the media system 100.

Figure 6:
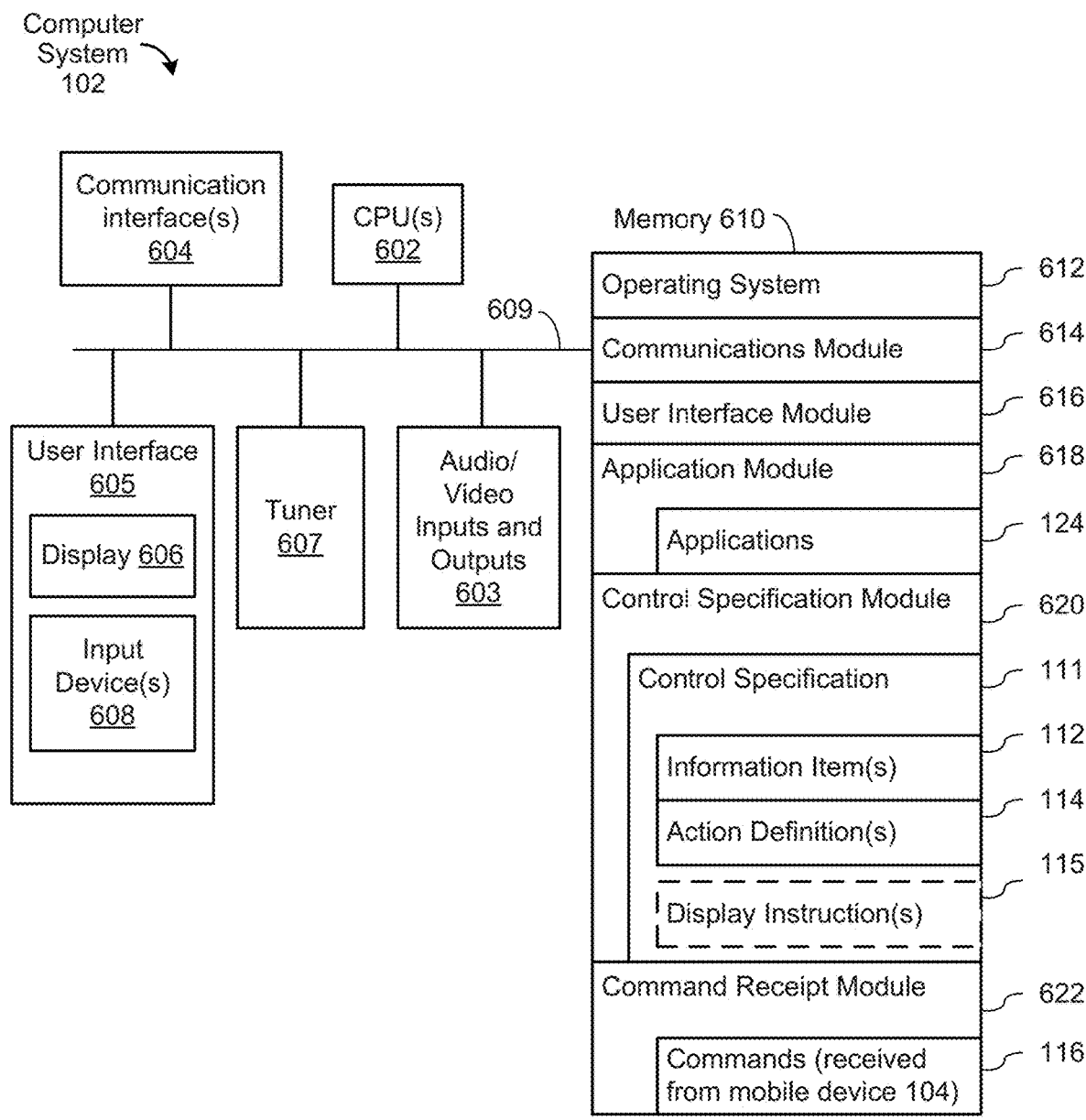
FIG. 6 is a block diagram illustrating a structure of a computer system, in accordance with some implementations.

FIG. 6 is a block diagram illustrating one implementation of the computer system 102 of the media system 100. The computer system 102 typically includes one or more processing units (CPUs, sometimes called processors) 602 for executing programs (e.g., programs stored in memory 610), one or more network or other communications interfaces 604, memory 610, and one or more communication buses 609 for interconnecting these components. The communication buses 609 may include circuitry (sometimes called a chipset) that interconnects and controls communications between system components.

The computer system 102 optionally includes a user interface 605 comprising a display 606 and input devices 608 (e.g., keyboard, mouse, touch screen, keypad, etc.). In some implementations, the computer system 102 is coupled to an external display (via the audio/visual inputs and outputs 603) such as the display device 110 of FIG. 1. In some implementations, the computer system 102 is incorporated into (i.e., in the same housing as) the display 606.

In some implementations, the computer system 102 includes a tuner 607 that is capable of receiving over-the-air TV signals. In some implementations, the tuner 607 receives other types of TV signals, such as cable, satellite, and/or internet TV signals. In some implementations, the tuner 607 is configured to receive analog and/or digital TV broadcasts.

In some implementations, the computer system 102 includes audio/video inputs and outputs 603. Audio/video inputs and outputs 603 are physical interfaces for establishing connections between various components or devices of a local portion of the media system 100. For example, in some implementations, the audio/video inputs and outputs 603 include connectors for HDMI cables, coaxial cables, VGA cables, optical cables, and the like. In some implementations, the audio/video inputs and outputs 603 provide a physical interface between the computer system 102, the media components 122, and the display device 110.

Memory 610 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 610 optionally includes one or more storage devices remotely located from the CPU(s) 602. Memory 610, or alternately the non-volatile memory device(s) within memory 610, comprises a non-transitory computer readable storage medium. In some implementations, memory 610 or the computer readable storage medium of memory 610 stores the following programs, modules, and data structures, or a subset thereof:

- an operating system 612 that includes procedures for handling various basic system services and for performing hardware dependent tasks;
- a communication module 614 that is used for connecting the computer system 102 to other computers (e.g., the mobile device 104) via the one or more communication interfaces 604 (wired or wireless) and one or more communication networks 120, such as the Internet, other wide area networks, local area networks, metropolitan area networks, and so on;
- a user interface module 616 that receives commands from the user via the input devices 608 (or external input device, such as the mobile device 104) and generates user interface objects in the display device 606, and/or a display device 110 coupled to the computer system 102 via the audio/video inputs and outputs 603;
- an application module 618 that includes and is configured to execute one or more applications 124;
- a control specification module 620 that generates and stores control specification(s) 111 for transmission to the mobile device 104; and
- a command receipt module 622 that receives commands 116 from the mobile device 104, and provides the commands 116 to an active application 124.

In some implementations, the programs or modules identified above correspond to sets of instructions for performing a function described in this application. The sets of instructions can be executed by one or more processors (e.g., the CPUs 602). The above identified modules or programs (i.e., sets of instructions) need not be implemented as separate software programs, procedures or modules, and thus various subsets of these programs or modules may be combined or otherwise re-arranged in various implementations. In some implementations, memory 610 stores a subset of the modules and data structures identified above. Furthermore, memory 610 may store additional modules and data structures not described above.

Although FIG. 6 shows a "computer system," FIG. 6 is intended more as functional description of the various features which may be present in a computer system than as a structural schematic of the implementations described herein. In practice, and as recognized by those of ordinary skill in the art, items shown separately could be combined and some items could be separated. For example, some items shown separately in FIG. 6 could be implemented together on a computer system and single items could be implemented by one or more modules, or one or more computer systems. The actual number of computer systems and modules used to implement a computer system 102, and how features are allocated among them, will vary from one implementation to another.

Figure 8:
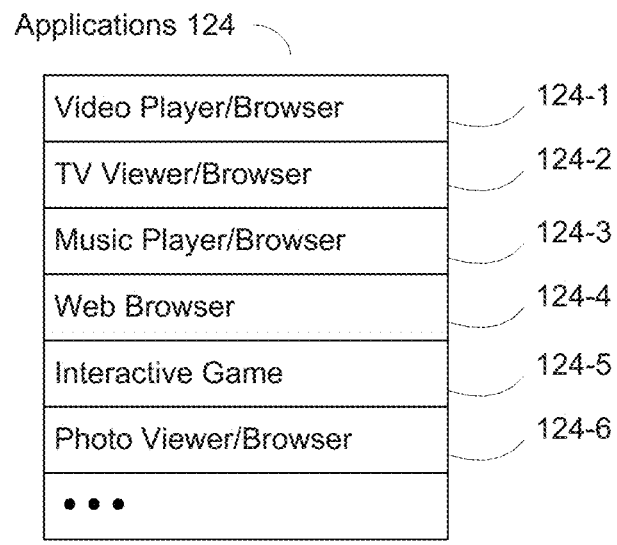
FIG. 8 is a block diagram illustrating exemplary applications, in accordance with some implementations.

In some implementations, the application module 618 includes, and is configured to execute, one or more applications 124-i, described with reference to FIG. 8. In some implementations, the one or more applications 124-i include a video player/browser application 124-1, a TV viewer/browser 124-2, a music player/browser application 124-3, a web browser application 124-4, an interactive game application 124-5, and/or a photo viewer/browser application 124-6. In some implementations, the one or more applications 124-i operate in conjunction with the control specification module 620 to generate a control specification 111.

In some implementations, the applications 124 are provided by entities that also provide media content access services. For example, a video viewing application may be created by, supplied by, and/or associated with a company that offers subscription-based access to a collection of video content. In some implementations, the computer system 102 executes the applications 124 from various media access services, such as video players from multiple different subscription services. In some implementations, the applications 124 are not associated with media access services, but rather facilitate access to a user's own media content, such as locally stored photographs and/or movies. It is understood that the reference to different media "applications" in the present application is intended as more of a functional description of the features of a particular media access paradigm, and does not necessarily describe specific programmatic or functional boundaries. The functionality associated with the separately described applications 124-i may be included in a single application or system.

In some implementations, the control specification module 620 operates in conjunction with the application module 618 (or the applications 124) to generate control specifications 111 for respective applications 124. In some implementations, the control specification module 620 includes one or more control specifications 111 including information items 112, action definitions 114, and display instructions 115. In some implementations, the control specification 111 includes only a subset of the items described. For example, in some implementations, the one or more control specifications 111 include only information items 112 and action definitions 114, as described above.

In some implementations, the control specification module 620 identifies an active application 124, and generates and/or identifies a control specification 111 for that application. The control specification module 620 then transmits the control specification 111 to the mobile device 104. As noted above, the control specification 111 may include one or more of information items 112, action definitions 114, and display instructions 115 that the mobile device 104 can use to generate a remote-control interface for whatever application 124 is being executed.

In some implementations, the control specification module 620 communicates with the mobile device 104 via the communications module 614 and the communication interface(s) 604. In some implementations, the applications 124 communicate the control specification 111 (and/or information items 112, action definitions 114, and display instructions 115) directly to the mobile device 104. In some implementations, the applications 124 share a common control specification module 620. In some implementations, each application 124 includes its own control specification module 620.

In some implementations, the control specification module 620 receives one or more of the information items 112, action definitions 114, and display instructions 115 from the applications 124 in order to generate the control specification 111. In some implementations, the control specification module 620 identifies one or more aspects of an application 124 and automatically generates a control specification 111 for that application 124. For example, the control specification module 620 may be able to determine that a video player/browser application is executing, and identify titles of videos that are accessible to the application and that should be displayed to the user on the mobile device 104. The control specification module 620 creates information items 112 that correspond to the identified videos. The information items 112 are sent to the mobile device 104 for display to a user. In some implementations, the control specification module 620 identifies information that is currently displayed by a respective application on the display device 110, and creates information items 112 based on that information. For example, a video player/browser application may display, on the display device 110, a list of available movies. The control specification module 620 can recognize that the displayed list (or a subset thereof) should be sent to the mobile device 104 for viewing and/or selection by a user. The control specification module 620 creates information items 112 based on the list of movies, and sends the information items 112 (optionally in conjunction with action definitions 114 and/or display instructions 115) to the mobile device 104.

In some implementations, the control specification module 620 automatically associates action definitions 114 with information items 112. For example, the control specification module 620 can identify information items 112, as described above, and determine that certain types of information items 112 should be associated with certain action definitions 114. For example, if an application 124 is configured to display movie titles, and those movies are associated with movie files available at uniform resource indicators (URIs), the control specification module 620 will associate the action of retrieving the movie file from the URI (i.e., the action definition) with the title of the move that is displayed to the user (i.e., the information item).

The control specification module 620 may additionally identify media-control functions that are associated with an active application. Continuing the video player/browser example, the control specification module 620 may identify that the video player can respond to (or requires) controls such as "play," "stop," "pause," etc. The control specification module 620 may include action definitions 114 for the identified functions, which will be sent to the mobile device 104 to appear as control buttons. In some implementations, the control specification module 620 associates those action definitions 114 with information items 112 (such as icons associated with the above described functions) in the control specification 111.

The computer system 102 also includes a command receipt module 622. The command receipt module 622 receives commands 116 from the mobile device 104, and provides the commands 116 to an active application 124. As described above, commands 116 are any information, data, or signal that specifies an action that the computer system 102, or an application 124 executing on the computer system 102, should perform. Commands 116 are specified by action definitions 114 that are sent to the mobile device 104, and may be received by the command receipt module 622 via the communications module 614 and/or the user interface module 616. In some implementations, the commands 116 are passed to an application 124 that is being executed by the computer system 102, so that the action associated with (or specified by) the command 116 can be performed. For example, if the command receipt module 622 receives a command 116 associated with the action "Play" while a video player/browser is being executed, the command receipt module 622 will pass the "Play" command to the video player, which may cause a selected video to be displayed on the display device 110.

Figure 7:
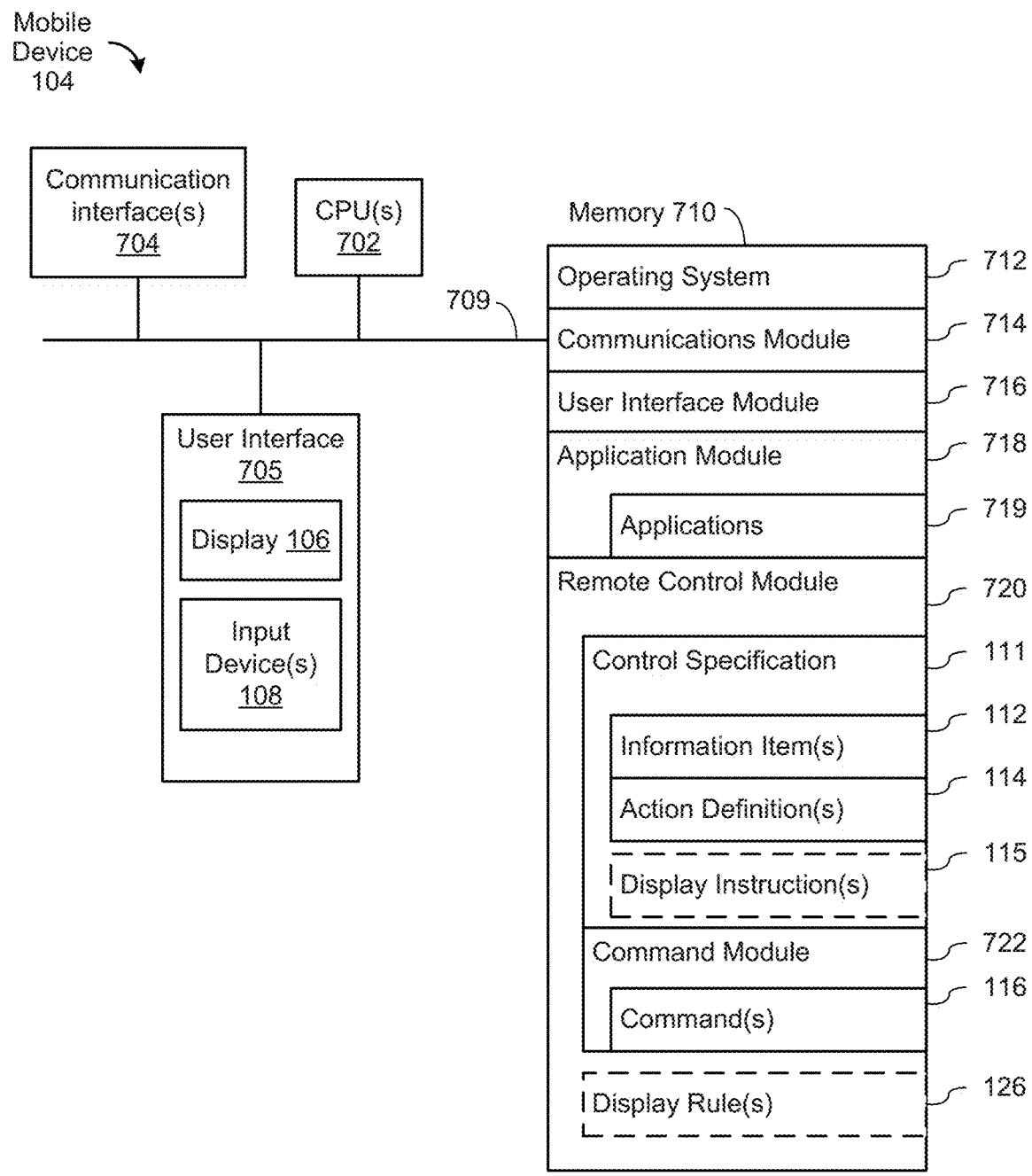
FIG. 7 is a block diagram illustrating a structure of a mobile device, in accordance with some implementations.

FIG. 7 is a block diagram illustrating one implementation of the mobile device 104. The mobile device 104 typically includes one or more processing units (CPUs, sometimes called processors) 702 for executing programs (e.g., programs stored in memory 710), one or more network or other communications interfaces 704, memory 710, and one or more communication buses 709 for interconnecting these components. The communication buses 709 may include circuitry (sometimes called a chipset) that interconnects and controls communications between system components.

The mobile device 104 optionally includes a user interface 705 comprising a display 106 and an input device 108 (e.g., keyboard, mouse, touch screen, keypad, joystick, button, track pad, etc.).

Memory 710 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 710 optionally includes one or more storage devices remotely located from the CPU(s) 702. Memory 710, or alternately the non-volatile memory device(s) within memory 710, comprises a non-transitory computer readable storage medium. In some implementations, memory 710 or the computer readable storage medium of memory 710 stores the following programs, modules, and data structures, or a subset thereof:

- an operating system 712 that includes procedures for handling various basic system services and for performing hardware dependent tasks;
- a communication module 714 that is used for connecting the mobile device 104 to other computers (e.g., the computer system 102) via the one or more communication interfaces 704 (wired or wireless) and one or more communication networks 120, such as the Internet, other wide area networks, local area networks, metropolitan area networks, and so on;
- a user interface module 716 that receives commands from the user via the input device(s) 108 and generates user interface objects in the display 106;
- an application module 718 that includes and is configured to execute one or more applications 719;
- a remote control module 720 that receives and stores control specification(s) 111 received from the computer system 102; and
- a command module 722 that receives user selections of information items 112 and sends commands 116 (corresponding to the commands specified in the action definitions 114) to the computer system 102.

In some implementations, the programs or modules identified above correspond to sets of instructions for performing a function described in this application. The sets of instructions can be executed by one or more processors (e.g., the CPUs 702). The above identified modules or programs (i.e., sets of instructions) need not be implemented as separate software programs, procedures or modules, and thus various subsets of these programs or modules may be combined or otherwise re-arranged in various implementations. In some implementations, memory 710 stores a subset of the modules and data structures identified above. Furthermore, memory 710 may store additional modules and data structures not described above.

FIG. 7 describes the mobile device 104, which can be a remote control, smart phone, tablet computer, or any other electronic device that can execute a program to control media content played on the display device 110 of FIG. 1. However, FIG. 7 is intended more as functional description of the various features which may be present in a mobile device (or other type of device) than as a structural schematic of the implementations described herein. In practice, and as recognized by those of ordinary skill in the art, items shown separately could be combined and some items could be separated. For example, some items shown separately in FIG. 7 could be implemented together on a mobile device (or other devices, such as computer system 102) and single items could be divided up and implemented by one or more modules, or one or more other devices. The actual number of devices and modules used to implement a mobile device 104, and how features are allocated among them, will vary from one implementation to another.

In some implementations, the application module 718 includes, and is configured to execute, one or more applications 719. The applications 719 may be any type of application, including but not limited to applications for entertainment, social networking, productivity, email, navigation, photography, etc. In some implementations, the mobile device 104 is a general purpose computing device, such that applications 719 may include any software adapted for use on the mobile device 104.

The remote control module 720 includes instructions and data for handling operations related to using the mobile device 104 as a remote control for the computer system 102. In some implementations, the remote control module 720 receives a control specification 111 from the computer system 102 or an application 124 being executed thereon. In some implementations, the control specification 111 includes information items 112, action definitions 114, and/or display instructions 115, as described above. In some implementations, the remote control module 720 includes display rules 126 that specify how information items 112 are to be displayed when display instructions 115 are not included in the control specification 111, as described above.

In some implementations, the remote control module 720 uses the control specification 111 to generate a user interface (e.g., user interface 300, 400, or 500) for display to the user on the display 106. The remote control module 720 may cooperate with the user interface module 716 to generate and/or display the user interface. In some implementations, the user interface is generated in accordance with the control specification 111. For example, the information items 112 may be processed and formatted for display on the mobile device 104 in accordance with the display instructions 115 or the display rules 126, as described above in relation to FIGS. 3-5.

In some implementations, the remote control module 720 includes a command module 722. The command module 722 receives user-selections of information items 112 via the input devices 108 (in conjunction with the user interface module 716), and sends commands 116 to the computer system 102. In some implementations, in response to receiving a user selection of an information item 112, the command module 722 identifies the action definition 114 associated with that information item 112. In some implementations, the command module 722 then identifies a command 116 in the action definition 114, and transmits the command 116 to the computer system 102. In some implementations, the command module 722 stores multiple commands 116, and looks-up an appropriate command 116 based on the action definition 114 associated with a user-selected information item 112. In some implementations, the command module 722 formats a command 116 into a data structure appropriate for transmission to the computer system 102.

In some implementations, the command module 722 sends the commands 116 to the computer system 102 via the communications interfaces 704 and the communications module 714. In some implementations, the commands 116 are sent using any appropriate communication protocol or method, including but not limited to infrared, wife, cellular, and/or local peer-to-peer connections, etc.

Figure 9:
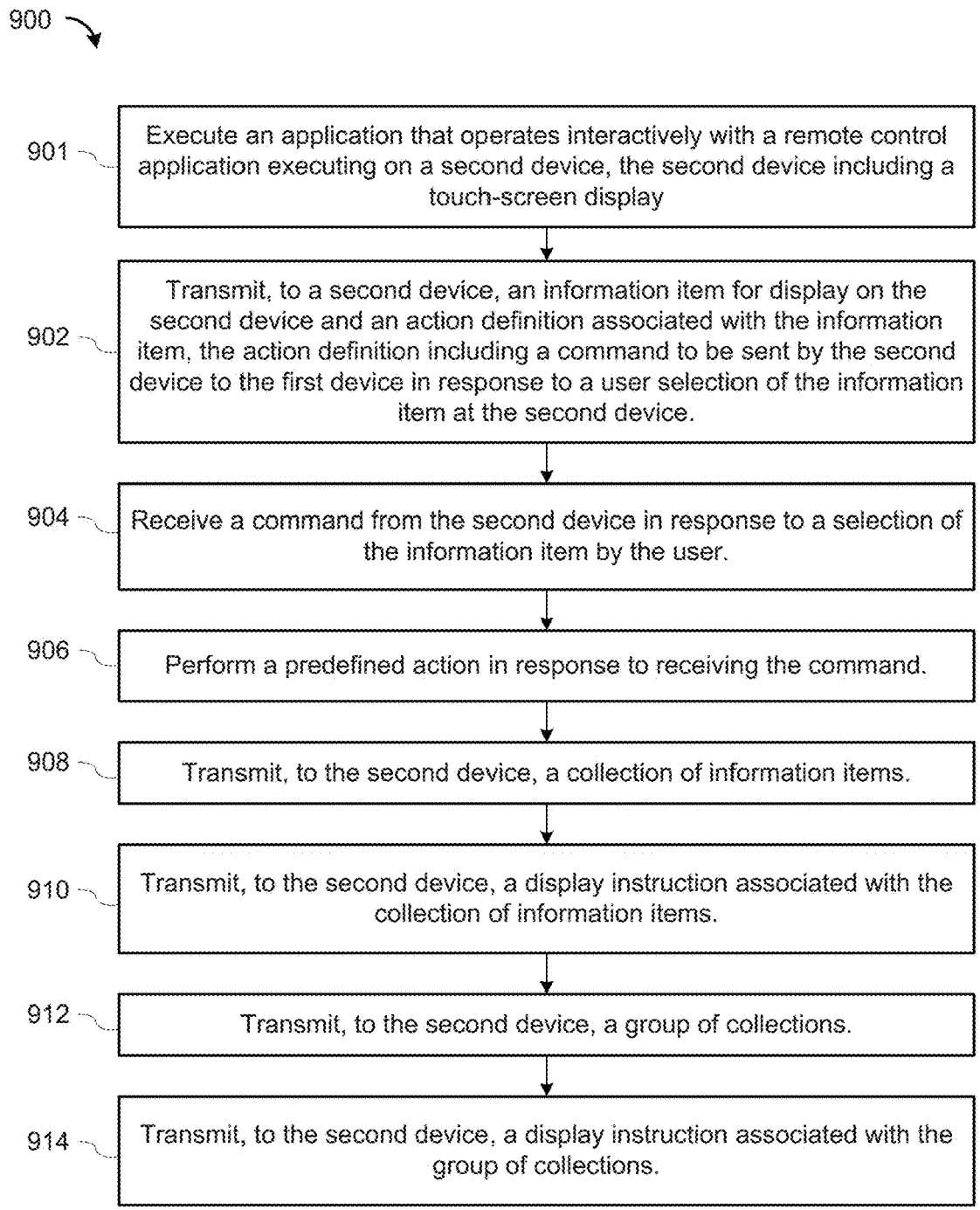
FIG. 9 is a flow chart illustrating a process for allowing interaction between devices, in accordance with some implementations.

Attention is now directed to FIG. 9, which is a flow diagram illustrating a process 900 for allowing interaction between devices, such as the computer system 102 and the mobile device 104, according to some implementations. Such methods may be useful for allowing a user to control multiple applications with a single remote control device.

The method 900 is performed at a computer system having one or more processors and memory. In some implementations, the method 900 is performed by the control specification module 620 and the command receipt module 622 of the computer system 102. An application is executed (901), where the application operates interactively with a remote control application executing on a second device. In some implementations, the second device includes a touch-screen display. In some implementations, the second device is a mobile device 104 as described above. Applications 124 are also described above, and may include media player/browser applications, such as video players and photo viewers.

In some implementations, an information item is transmitted (902) to a second device for display on the second device. An action definition is also transmitted (902) to the second device, where the action definition is associated with the information item. The action definition includes a command to be sent by the second device to the first device in response to a user selection of the information item at the second device. Information items 112 and action items 114 are described in detail above.

In some implementations, a command is received (904) from the second device in response to a selection of the information item by the user. As described above, a command 116 may be sent from the mobile device 104 to the computer system 102 in response to a user selection of an information item 112. In some implementations, a predefined action is performed (906) in response to receiving the command.

In some implementations, a collection of information items is transmitted (908) to the second device. In some implementations, a display instruction associated with the collection of information items is transmitted (910) to the second device. For example, a display instruction (e.g., display instruction 115 or display rule 126) may indicate that each information item 112 in the collection of information items should be displayed as a thumbnail in a gallery format.

In some implementations, a group of collections is transmitted (912) to the second device. In some implementations, a display instruction associated with the group of collections is transmitted (914) to the second device. For example, a display instruction (e.g., display instruction 115 or display rule 126) may indicate that each collection is to be displayed within a separate tab, and the information items 112 within each collection are to be displayed in a list format.

Figure 10:
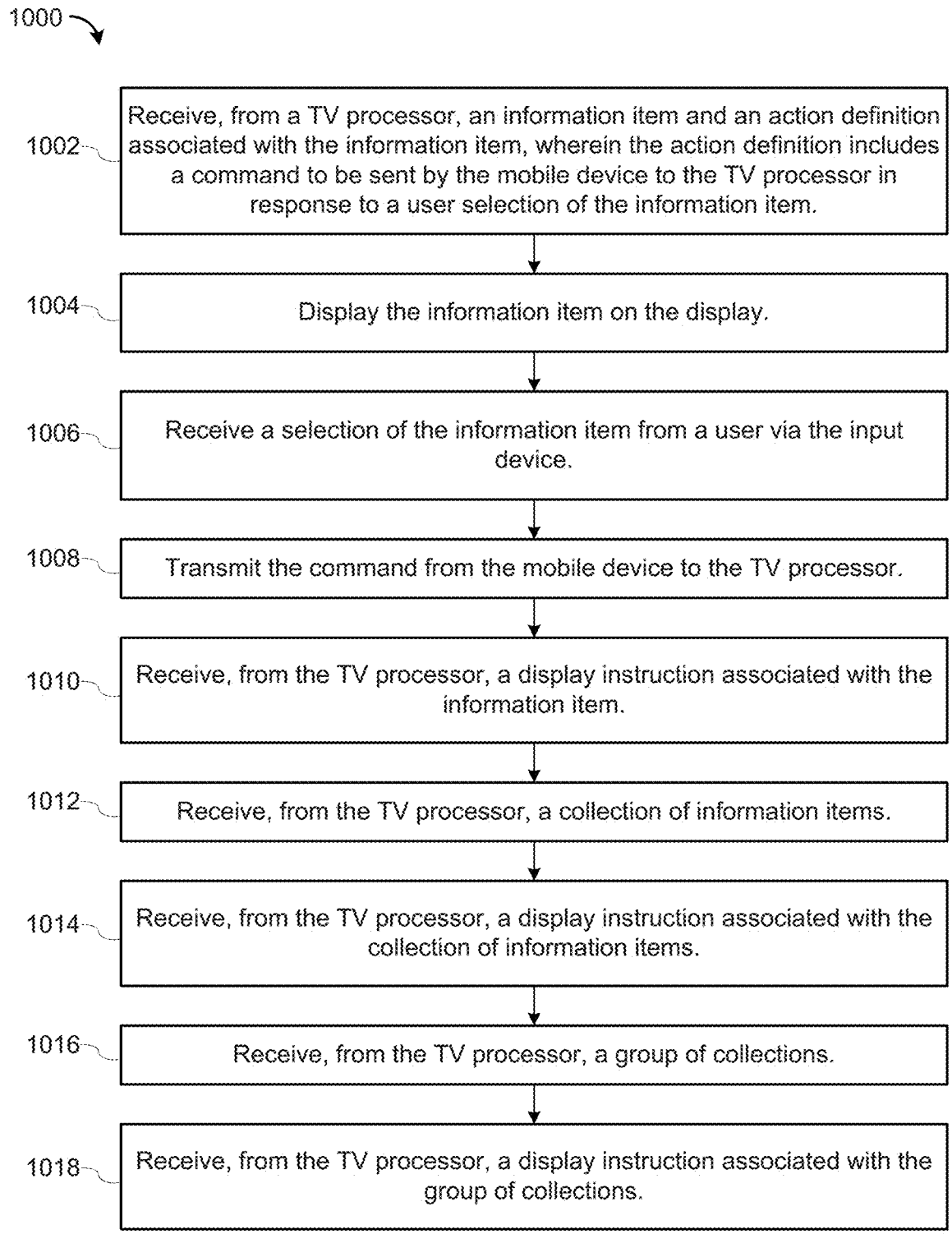
FIG. 10 is a flow chart illustrating a process for allowing interaction between devices, in accordance with some implementations.

Attention is now directed to FIG. 10, which is a flow diagram illustrating a process 1000 for allowing interaction between devices, such as the computer system 102 and the mobile device 104, according to some implementations.

The method 1000 is performed at a computer system having one or more processors, memory, a display, and an input device. In some implementations, the method 1000 is performed by the remote control module 720 of the mobile device 104. An information item and an action definition associated with the information item are received (1002) from a TV processor. In some implementations, the TV processor corresponds to a computer system 102 as described above. The action definition includes a command to be sent by the mobile device to the TV processor in response to a user selection of the information item. The information item is displayed (1004) on the display. The information item (e.g., information item 112) may be displayed in accordance with a display instruction 115 or a display rule 126, as described above. A selection of the information item is received (1006) from a user via the input device. The command is transmitted (1008) from the mobile device to the TV processor.

In some implementations, a display instruction associated with the information item is received (1010) from the TV processor. Display instructions (e.g., display instruction 115 or display rule 126) are discussed in detail above.

In some implementations, a collection of information items is received (1012) from the TV processor. In some implementations, a display instruction associated with the collection of information items is received (1014) from the TV processor. For example, a display instruction (e.g., display instruction 115 or display rule 126) may indicate that each information item 112 in the collection of information items should be displayed as a thumbnail in a gallery format.

In some implementations, a group of collections is received (1016) from the TV processor. In some implementations, a display instruction associated with the group of collection is received (1018) from the TV processor. For example, a display instruction (e.g., display instruction 115 or display rule 126) may indicate that each collection is to be displayed within a separate tab, and the information items 112 within each collection are to be displayed in a list format.

Each of the methods described herein may be governed by instructions that are stored in a non-transitory computer readable storage medium and that are executed by one or more processors of one or more electronic devices (e.g., computer system 102, mobile device 104). Each of the operations shown in FIGS. 9-10 may correspond to instructions stored in a computer memory or computer readable storage medium.

The foregoing description, for purpose of explanation, has referenced specific implementations. However, the illustrative discussions above are not intended to be exhaustive or to limit the disclosed ideas to the precise forms disclosed. Many modifications and variations are possible in view of the above teachings. The implementations were chosen and described in order to best explain the principles and practical applications of the disclosed ideas, to thereby enable others skilled in the art to best utilize them in various implementations with various modifications as are suited to the particular use contemplated.

Moreover, in the preceding description, numerous specific details are set forth to provide a thorough understanding of the presented ideas. However, it will be apparent to one of ordinary skill in the art that these ideas may be practiced without these particular details. In other instances, methods, procedures, components, and networks that are well known to those of ordinary skill in the art are not described in detail to avoid obscuring aspects of the ideas presented herein.

What is claimed is:

1. A computer-implemented method, comprising:
   at a computer system that is coupled to a media device and facilitates the media device to output media content provided by a plurality of media content sources:
   executing an application that accesses the plurality of media content sources and outputs media content provided thereby, wherein the application operates interactively with a remote control application executed on a client device that is distinct and remote from the computer system;

obtaining an information item corresponding to one or more media content items that are provided by the plurality of media content sources accessible via the computer system, wherein the information item is configured to be displayed by the remote control application on the client device, wherein the information item is associated with a command to be sent by the client device to the computer system in response to a selection of the information item at the client device;

transmitting the information item from the computer system to the client device; and in response to the selection of the information item at the client device, executing the command in relation to the one or more media content items corresponding to the plurality of media content sources.

2. The computer-implemented method of claim 1, wherein the one or more media content items include an audio track, and wherein the plurality of media content sources include an Internet-based audio channel with which the audio track is associated.

3. The method of claim 1, further comprising:
incorporating by the computer system the information item and the command in an HTML file; and
transmitting the command associated with the information item to the client device.

4. The method of claim 1, further comprising:
in response to the user input, receiving by the computer system the command from the client device to perform a specified action with respect to the one or more media content items corresponding to the information item.

5. The method of claim 1, wherein executing the command further comprises:
in response to the user input, controlling, by the computer system, the media device to play the one or more media content items.

6. The method of claim 1, further comprising:
retrieving, by the client device, display rules, wherein the display rules provide instructions for displaying the information item in a user interface of the client device; and
displaying the information item in the user interface of the client device according to the display rules.

7. The method of claim 1, wherein the media device is a speaker device.

8. The method of claim 7, wherein executing the command includes altering playback of an audio track on the media device.

9. The method of claim 7, wherein the command associated with the information item comprises at least one of:
a Play command;
a Stop command; and
a Pause command.

10. The method of claim 1, wherein the information item includes information describing the one or more media content items, and the information describing the one or more media content items further comprises:
a title of the media content items; and
an image associated with the media content items.

11. The method of claim 10, wherein the information item further includes information describing an Internet-based audio channel with which an audio track is associated.

12. A computer system, coupled to a media device and facilitates the media device to output media content provided by a plurality of media content sources, comprising:
one or more processors;
memory storing one or more programs, wherein the one or more programs are configured to be executed by the one or more processors and include instructions for:
executing an application that accesses the plurality of media content sources and outputs media content provided thereby, wherein the application operates interactively with a remote control application executed on a client device that is distinct and remote from the computer system;
obtaining an information item corresponding to one or more media content items that are provided by the plurality of media content sources accessible via the computer system, wherein the information item is configured to be displayed by the remote control application on the client device, wherein the information item is associated with a command to be sent by the client device to the computer system in response to a selection of the information item at the client device;
transmitting the information item from the computer system to the client device; and
in response to the selection of the information item at the client device, executing the command in relation to the one or more media content items corresponding to the plurality of media content sources.

13. The computer system of claim 12, wherein the one or more programs further comprise instructions for:
retrieving, by the client device, display rules, wherein the display rules provide instructions for displaying the information item in a user interface of the client device; and
displaying the information item in the user interface of the client device according to the display rules.

14. The computer system of claim 12, wherein the one or more programs further comprise instructions for:
sending a display instruction associated with the information item, wherein the display instruction indicates that the one or more media content items are to be displayed in a list format, a tree format, a gallery format, or a hierarchical folder format.

15. The computer system of claim 12, wherein the information item corresponds to a single media content item provided by the plurality of media content sources or a folder containing multiple media content items provided by the plurality of media content sources.

16. The computer system of claim 12, wherein the information item includes information describing the one or more media content items, which is configured to be displayed by the remote control application on the client device.

17. The computer system of claim 16, wherein the information describing one or more media content items is selected from a group consisting of a title, a file name, a thumbnail, and description of the one or more media content items.

18. A non-transitory computer-readable storage medium storing one or more programs, the one or more programs comprising instructions, which when executed by a processor of a computer system, cause the computer system to perform operations for:
at the computer system that is coupled to a media device and facilitates the media device to output media content provided by a plurality of media content sources:
executing an application that accesses the plurality of media content sources and outputs media content provided thereby, wherein the application operates interactively with a remote control application executed on a client device that is distinct and remote from the computer system;

obtaining an information item corresponding to one or more media content items that are provided by the plurality of media content sources accessible via the computer system, wherein the information item is configured to be displayed by the remote control application on the client device, wherein the information item is associated with a command to be sent by the client device to the computer system in response to a selection of the information item at the client device;

transmitting the information item from the computer system to the client device; and in response to the selection of the information item at the client device, executing the command in relation to the one or more media content items corresponding to the plurality of media content sources.

19. The non-transitory computer-readable storage medium of claim 18, the one or more programs further comprising instructions for concurrently:

displaying the information item in a user interface of the client device, wherein the user interface includes a content region and a control region that are distinct from each other; and displaying one or more predefined playback controls in the control region, independently of the plurality of media content sources, when information describing the one or more media content items is displayed in the content region.

20. The non-transitory computer-readable storage medium of claim 19, wherein the one or more predefined playback controls are represented by a subset of a plurality of icons for rewinding, stopping, playing, pausing, and fast-forwarding media content.

21. The non-transitory computer-readable storage medium of claim 19, wherein the control region is fixed on the user interface of the client device, and configured to display the one or more predefined playback controls according to a template, and the content region of the user interface is customized dynamically based on the plurality of media content sources.

* * * * *